(12) United States Patent
Belleville et al.

(10) Patent No.: US 9,156,995 B2
(45) Date of Patent: Oct. 13, 2015

(54) PREPARATION OF STABLE METAL OXIDE SOLS, NOTABLY FOR MAKING THIN ABRASION-RESISTANT FILMS WITH OPTICAL PROPERTIES

(75) Inventors: Philippe Belleville, Tours (FR); Philippe Prene, Artannes sur Indre (FR); Xavier Le Guevel, Herbignac (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 13/989,796

(22) PCT Filed: Nov. 24, 2011

(86) PCT No.: PCT/EP2011/070905
§ 371 (c)(1),
(2), (4) Date: Sep. 24, 2013

(87) PCT Pub. No.: WO2012/069570
PCT Pub. Date: May 31, 2012

(65) Prior Publication Data
US 2014/0037839 A1    Feb. 6, 2014

(30) Foreign Application Priority Data
Nov. 26, 2010 (FR) ...................................... 10 59774

(51) Int. Cl.
*C09D 5/00* (2006.01)
*C01B 33/141* (2006.01)
(Continued)

(52) U.S. Cl.
CPC .............. *C09D 5/006* (2013.01); *C01B 33/141* (2013.01); *C01B 33/142* (2013.01); *C01F 7/34* (2013.01);
(Continued)

(58) Field of Classification Search
None
See application file for complete search history.

(56) References Cited

U.S. PATENT DOCUMENTS 5,698,266 A * 12/1997 Floch et al. ................ 427/376.2
7,485,343 B1 * 2/2009 Branson et al. ............ 427/335
(Continued)

FOREIGN PATENT DOCUMENTS

EP    2213623 A1    8/2010
FR    2703791 A1    10/1994
(Continued)

OTHER PUBLICATIONS

Belleville et al, SPIE vol. 2288 Sol-Gel Optics, pp. 25-32, 1994.*
(Continued)

*Primary Examiner* — Erma Cameron
(74) *Attorney, Agent, or Firm* — Hultquist, PLLC; Mary B. Grant

(57) ABSTRACT

The invention relates to a method for preparing sols of metal oxides, with an aqueous component, which are stable over time and which notably allow the making of thin films having both remarkable optical and abrasion resistance properties.
This method comprises: (i) replacing with water all or part of the alcohol or of the alcohols present in an alcoholic sol of a metal oxide, with a neutral or basic pH, and optionally (ii) adjusting the pH of the thereby obtained aqueous or partly aqueous sol to a value of at least 8.
The invention also relates to a method for making films from these sols and, in particular, thin films with optical properties and resistant to abrasion.
Applications: making optical components for power lasers, making optical fibers, cathodic tubes, etc.

24 Claims, 2 Drawing Sheets

(51) Int. Cl.
  *C01B 33/142* (2006.01)
  *C01G 25/02* (2006.01)
  *C03C 17/25* (2006.01)
  *C01G 23/053* (2006.01)
  *C01F 7/34* (2006.01)
  *C01F 7/36* (2006.01)

(52) U.S. Cl.
  CPC ............... *C01F 7/36* (2013.01); *C01G 23/053* (2013.01); *C01G 25/02* (2013.01); *C03C 17/25* (2013.01); *C01P 2002/72* (2013.01); *C01P 2006/12* (2013.01); *C03C 2217/213* (2013.01); *C03C 2218/32* (2013.01)

(56) References Cited

U.S. PATENT DOCUMENTS

| | | | |
|---|---|---|---|
| 2002/0090519 | A1 | 7/2002 | Kursawe et al. |
| 2006/0182942 | A1 | 8/2006 | Valle et al. |
| 2006/0286813 | A1* | 12/2006 | Meredith et al. ............. 438/781 |
| 2007/0148435 | A1* | 6/2007 | Meredith et al. ........... 428/312.6 |
| 2008/0090071 | A1 | 4/2008 | Valle et al. |
| 2008/0175985 | A1 | 7/2008 | Belleville et al. |
| 2008/0182128 | A1 | 7/2008 | Boy et al. |
| 2008/0258270 | A1 | 10/2008 | Bondoux et al. |
| 2008/0292790 | A1 | 11/2008 | Lebrette et al. |
| 2009/0046379 | A1 | 2/2009 | Kuramoto et al. |
| 2011/0003130 | A1 | 1/2011 | Marchet et al. |
| 2011/0257298 | A1 | 10/2011 | Ishihara et al. |

FOREIGN PATENT DOCUMENTS

| | | |
|---|---|---|
| GB | 660593 A | 11/1951 |
| GB | 1362250 A | 7/1974 |
| WO | 2010073772 A1 | 7/2010 |

OTHER PUBLICATIONS

Shen et al, Guisuanyan Xuebao, 38(11), pp. 2054-2058, 2010.*
Li et al, J. Sol-Gel Sci. Technol., 59, pp. 539-545, 2011.*
Unpublished U.S. Appl. No. 13/639,476, filed on Oct. 4, 2012.
Note: As to any unpublished U.S. applications cited herein, Applicant will provide at the examiner's request copies of any documents desired by the examiner from the USPTO file history of any such unpublished application.
Gulley, G., et al., "Stabilization of Colloidal Silica Using Polyols", "Journal of Colloid and Interface Science", Sep. 15, 2001, pp. 340-345, vol. 141.
Neel, O., et al., "Fluidification of Concentrated Aqueous Colloidal Silica Suspensions by Adsorption of Low-Molecular-Weight Poly-(ethylene oxide)", "Journal of Colloid and Interface Science", Oct. 15, 2000, pp. 244-253, vol. 230.

* cited by examiner

PREPARATION OF STABLE METAL OXIDE SOLS, NOTABLY FOR MAKING THIN ABRASION-RESISTANT FILMS WITH OPTICAL PROPERTIES

CROSS-REFERENCE TO RELATED APPLICATIONS

This application is a U.S. national phase under the provisions of 35 U.S.C. §371 of International Patent Application No. PCT/EP11/70905 filed Nov. 24, 2011, which in turn claims priority of French Patent Application No. 1059774 filed Nov. 26, 2010. The disclosures of such international patent application and French priority patent application are hereby incorporated herein by reference in their respective entireties, for all purposes.

TECHNICAL FIELD

The present invention relates to a method for preparing sols, or colloidal solutions, of metal oxides with an aqueous component, which are stable over time and which notably allow the manufacturing of thin films having both remarkable optical (anti-reflective, . . . ) properties and abrasion resistance.

The invention also relates to a method for manufacturing films from these sols and, in particular, thin abrasion-resistant films with optical properties.

Such films find a multitude of applications, notably in the manufacturing of optical components of the lens, window, and anti-debris screen, grating and phase plate types, intended to enter the constitution of power lasers, in the manufacturing of optical fibers, of cathode-ray tubes and of generally transparent optical supports, as well as on substrates used in microelectronics in which a low dielectric constant layer is required (capacitors, insulators, . . . ).

STATE OF THE PRIOR ART

The manufacturing of optical films by the sol-gel technique may be achieved according to two distinct synthesis routes:
  the polymeric route, which consists of elaborating a solution of a precursor material of a metal oxide in a monomeric or oligomeric form which is converted into an oxide after application on a substrate. This real solution experiences a time-dependent change in its viscosity upon evaporation of the solvent and optionally forms a gel on the surface. The conversion into an oxide is generally obtained after provision of water (ambient hydrolysis) and a heat treatment. A dense film with high refractive index and mechanically resistant is thereby obtained but the implicit mass loss and the shrinkage of the film frequently generate stresses in the deposit.
  the colloidal route, wherein the conversion into oxide is chemically achieved in solution before deposition on the substrate. The obtained layers are porous, with low refractive index, mechanically brittle, but they are free of internal stresses.

For manufacturing anti-reflective thin films, the colloidal synthesis route is preferred which provides not only greater ease of implementation (no thermal step), but also better performances, notably as regards the refractive index of the obtained films.

Presently, this colloidal synthesis route is applied in an alcoholic medium as this is for example described in patent application FR-A-2 703 791 [1].

Yet, on an industrial scale, the use of alcohols generates constraints, notably in terms of safety and observance of the environment.

It would therefore be desirable to be able to produce antireflective films from aqueous sols of metal oxides or, at the very least, partly aqueous so as to reduce the amounts of alcohols used for lack of totally suppressing the use of alcohols.

Yet, the problem generally posed by sols of metal oxides prepared in an aqueous or partly aqueous medium is their lack of stability and the difficulty of their being deposited as films considering their low wettability on the surfaces.

The generally recommended solution for stabilizing metal particles present in an aqueous phase consists of using stabilizers.

Thus, for example, Gulley et al. (*Journal of Colloid and Interface Science*, 241 (2001) 340-345, [2]) have shown that by using polyols with a small carbonaceous chain it is possible to stabilize highly diluted aqueous colloidal silica (0.052% by mass), even under high pH conditions. The polyols form a solvation cage around the silica particles, which slows down their aggregation.

Neel et al. (*Journal of Colloid and Interface Science*, 230 (2000) 244-253, [3]) have, themselves, shown that it is possible to obtain a homogeneous sol of colloidal silica, i.e. a sol in which the silica particles are regularly dispersed, by incorporating therein a surfactant such as a polyethylene oxide, which plays the role of a fluidifying agent and prevents the silica particles from forming aggregates.

Moreover, concentrated (with 30%, 40% by mass of silica) aqueous colloidal silica sols of different pHs and stabilized by stabilizers such as sodium or chlorides, are commercially available (Ludox™, Klebosol™, etc.).

However, it is found that aqueous sols of metal oxides which contain one or several stabilizers cannot be used for producing antireflective thin films since the presence of stabilizers, regardless of their nature, does not give the possibility of obtaining the optical transparency properties and mechanical properties required for this type of films.

The Inventors therefore set the goal of providing a method which gives the possibility of making aqueous or partly aqueous metal oxide sols which are stable for a period of several months or even of one year and this, without resorting to any stabilizer.

Now, within the scope of the work which they have been conducting for years on the elaboration of optical films and, in particular, of antireflective film films, the Inventors have noticed in quite a surprising way that it is possible to have metal oxide sols, either aqueous or with a high water content, and nevertheless exhibiting remarkable stability over time provided that these sols have a pH greater than or equal to 8, on the one hand, and are prepared from sols obtained beforehand by hydrolysis-condensation of precursors of these metal oxides in an alcoholic medium of neutral or basic pH, on the other hand.

They further noticed that these sols of metal oxides, either aqueous or with a high water content, have intrinsic physicochemical properties such that they give the possibility of manufacturing antireflective thin films, for which the abrasion resistance is very clearly greater than that of thin films obtained from alcoholic sols having been used for preparing these aqueous sols or with high water content And it is on these observations that the present invention is based.

DISCUSSION OF THE INVENTION

Firstly the object of the invention is a method for preparing a sol of a metal oxide, either aqueous or partly aqueous, and with a pH greater than or equal to 8, which method comprises:

(i) replacing with water all or part of the alcohol or alcohols present in an alcoholic sol of said metal oxide of neutral or basic pH and optionally (ii) adjusting the pH of the thereby obtained aqueous or partly aqueous sol to a value of at least 8.

In the foregoing and in the following, by <<sol>> is meant a colloidal solution.

Moreover, by <<alcoholic sol>>, is meant a sol for which the solvent is an alcohol or a mixture of alcohols and which does not contain any water, and by <<aqueous>> sol, is meant a sol for which the solvent is water and which does not contain any alcohol.

A sol for which the solvent is a mixture of water and alcohol will therefore be described in the following as a <<partly aqueous>> or <<hydroalcoholic>> sol.

In a first preferred embodiment of the method according to the invention, the alcoholic sol of the metal oxide is obtained beforehand by:

($a_1$) hydrolysis of a precursor of said metal oxide at a pH ranging from 8 to 14, advantageously of 9±0.3, in an alcohol or a mixture of alcohols added with a base, for example ammonia or soda, and then ($b_1$) ripening of the thereby obtained sol at room temperature.

In this case, the replacement with water of all or part of the alcohol or of the alcohols present in the alcoholic sol is then preferably achieved by:

($c_1$) diluting this sol by adding a mixture of water and of one or several alcohols to obtain a hydroalcoholic sol, the alcohol or the alcohols being preferably identical with the one or with those already present in the alcoholic sol, and then ($d_1$) concentrating the thereby obtained hydroalcoholic sol, under conditions which give the possibility of removing from this sol all or part of the alcohol or the alcohols which it contains without removing water therefrom in order to obtain an aqueous or partly aqueous sol.

Moreover it is desirable that the step for concentrating the hydroalcoholic sol be carried out under conditions such that this sol is not transformed into a gel during this step.

This is why this sol is preferably concentrated by evaporation of the alcohol or of the alcohols in a rotary evaporator, at a temperature ranging from 20 to 55° C., for example 40° C., and under a pressure ranging from 20 to 200 mPa, for example 100 mPa.

It is obvious that the dilution rate of the alcoholic sol by the water/alcohol(s) mixture, the mass ratio of the water to the alcohol or to the alcohols present in this mixture and the concentration level of the hydroalcoholic sol are selected depending on the mass contents of water and of metal oxide that shall have the aqueous or partly aqueous sol which is desirably prepared, taking into account the mass content of metal oxide that has the alcoholic sol which is used for its preparation.

In another preferred embodiment of the method according to the invention, the alcoholic sol of the metal oxide is obtained beforehand by:

($a_2$) hydrolysis of a precursor of said metal oxide at a neutral pH in an alcohol or a mixture of alcohols, and then ($b_2$) ripening of the thereby obtained sol at room temperature.

In this case, the replacement with water of all or part of the alcohol or of the alcohols present in the alcoholic sol is then preferentially achieved by:

($c_2$) dialysis of this sol in water in order to obtain a hydroalcoholic sol, for example by placing said sol in a bag consisting of a semi-permeable membrane in cellulose, and then, after closing the bag, by immersing the latter in a volume of water maintained at a temperature of 40° C.±5° C. and maintaining it in this volume of water for a sufficient period of time in order to obtain penetration into the bag of the amount of the desired amount of water, and then ($d_2$) concentration of the thereby obtained hydroalcoholic sol, under conditions which give the possibility of removing from this sol all or part of the alcohol or of the alcohols which it contains without removing the water in order to obtain an aqueous or partly aqueous sol.

There also, this concentration operation is preferably carried out by evaporating the alcohol or the alcohols in a rotary evaporator, by using temperature and pressure conditions similar to those mentioned earlier, and the duration of the dialysis as well as the concentration level of the hydroalcoholic sol are selected according to the mass contents of water and of metal oxide which shall have the aqueous or partly aqueous sol which is desirably prepared, taking into account the mass content of metal oxide that has the alcoholic sol which is used for its preparation.

The aqueous or partly aqueous sol, obtained at the end of step ($d_2$), having in principle a neutral pH or very close to neutrality, its pH is necessarily adjusted to a value at least equal to 8, by adding a weak or strong base, for example ammonia or soda.

Regardless of the mode by which the method according to the invention is implemented, the use of absolute ethanol as an alcohol and of ammonia ($NH_4OH$) as a base is preferred.

Moreover, it is preferred that the aqueous or partly aqueous metal oxide sol be a sol of silica, zirconia, alumina, or of titanium oxide and, in particular, a silica sol.

Also, the alcoholic sol is preferably obtained beforehand by hydrolysis-condensation of a metal oxide precursor of formula $A_xM_y$, in which M represents a metal or a metalloid selected from silicon, zirconium, aluminum, and titanium, while A represents a hydrolyzable group, for example selected from the group comprising a halide (such as a fluoride, chloride, bromide or iodide), a nitrate, an oxalate, a carbonate, a sulfate, an alcoholate of formula R—O⁻ wherein R is a linear or branched alkyl group preferably comprising from 1 to 10 carbon atoms and still better from 1 to 3 carbon atoms, or a phenyl group.

Thus, particularly preferred metal oxide precursors are tetramethoxysilane, further known under the name of tetramethylorthosilicate (TMOS), and tetraethoxysilane, further known under the name of tetraethylorthosilicate (TEOS), which lead to silica sols.

It is also preferred that the aqueous or partly aqueous metal oxide sol have a mass content of metal oxide ranging from 1 to 10% and, still better, from 2 to 6%, a water mass content of more than 20% and, still better, more than 40% and a pH ranging from 8 to 10 and, still better, of 9±0.3.

The method described above leads to the obtaining of aqueous or partly aqueous metal oxide sols, for which the viscosity varies at most by ±35% over a time period of at least one year.

The object of the invention is also a method for making a film, which method comprises the deposition on a substrate of one or several layers of an aqueous or partly aqueous metal oxide sol as obtained by the method described above, and the drying of this(these) layer(s).

According to the invention, the deposition of the layer or of the layers of the sol on the substrate may be carried out with any of the conventionally used techniques for depositing a sol on a substrate such as for example spray-coating, spin-coating, drop-coating, dip-coating, meniscus-coating, soak-coating, roll to roll process, or further painting-coating.

Among these techniques, notably in the case when it is desired to make an anti-reflective thin film, spin-coating, dip-coating and meniscus-coating are preferred, since they are the ones which allow better controlling the thickness of the sol layers deposited on the substrate.

Regardless of the deposition technique used, the solvent present in the sol is removed by evaporation, the latter may naturally be accomplished in free air or may be facilitated, for example by applying a gas flow, by thermal or radiative heating insofar that the temperature alters neither the sol, nor the underlying substrate or further by mechanical means such as the rotation of the substrate as during a deposition by spin-coating.

A film with strong porosity (greater than 50%) is thus obtained, for which the refractive index ranges from 1.22 to 1.28 and which has an optical transmission percentage of more than 99%.

This film is therefore suitable for being used as an anti-reflective film.

In the case when it is desired to give it abrasion resistance properties, the method further comprises the treatment of the film with a base in a liquid or gas medium.

This treatment may notably be carried out as described in patent application FR-A-2 703 791, already mentioned.

Thus, it is possible to use as a base, soda, potash, tetram-ethyl-ammonium hydroxide, hydroxylamine or ammonia, and to treat the film, either with a solution of one of these bases or with vapors in the case of ammonia, which may be accomplished by maintaining the substrate covered with said film, for example for 12 to 24 hours, in a hermetically sealed enclosure of the dryer type, in which is placed an aqueous solution of ammonia or which is fed with ammonia vapors.

In this case, the film is preferably treated with ammonia vapors.

According to the invention, the thereby obtained film may further be subject to a post-treatment capable of improving one of its properties depending on the use to which is intended this film.

Thus, notably, it may be subject to a post-treatment capable of improving its hydrophobicity like notably a post-treatment with hexamethyldisilazane (HMDS) or with fluorosilanes in a liquid or gas medium.

In a liquid medium, this post-treatment may for example be accomplished by immersing the thin film in an alcohol sol with 5% by mass of HMDS, for example for 10 to 15 hours and then by withdrawing this film from the sol at a speed of the order of 3 cm/min with an extraction rate, while, in a gas medium, this may be achieved by maintaining the thin film, for example for 48 hours, in a hermetically sealed enclosure in which is placed a sol of HMDS.

Whatever the case, the film is preferably a thin film, i.e. a thin film which measures from 5 to 500 nm thick and still better, from 10 to 250 nm thick, and, which further is a thin silica film.

Other features and advantages of the invention will become better apparent upon reading the additional description which follows, which refers to examples for preparing colloidal silica sols and thin films with methods according to the invention and of demonstration of the features and properties of the thereby prepared sols and films.

Of course, these examples are only given as illustrations of the object of the invention and are by no means a limitation of this object.

SHORT DESCRIPTION OF THE DRAWINGS

Figure 3:
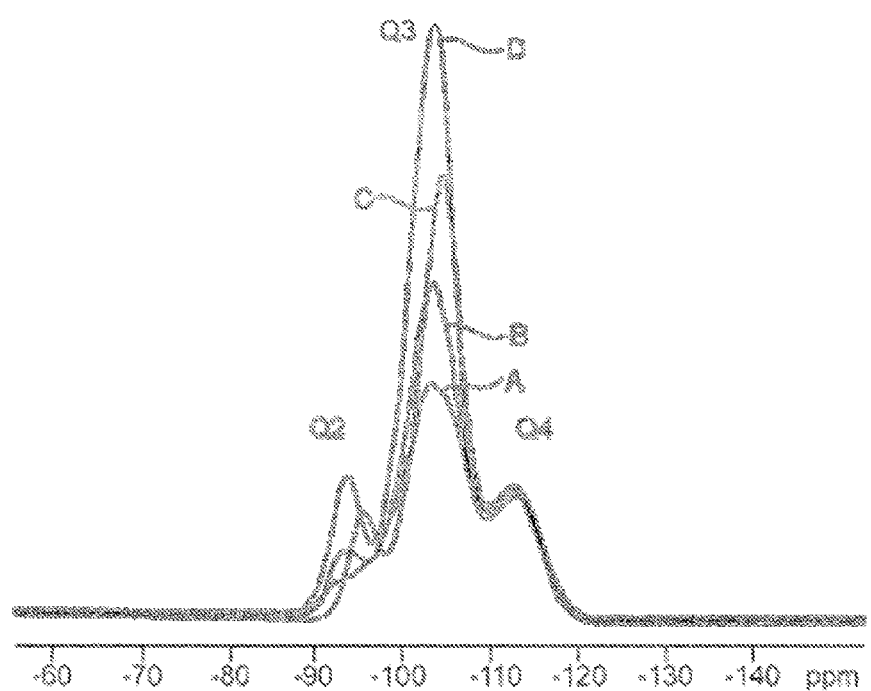

FIG. 3 illustrates the $^{29}$Si CP/MAS NMR spectra exhibited by powders respectively obtained from a colloidal silica sol prepared by the method according to the invention (curve D), from the alcoholic colloidal silica sol used for preparing this sol (curve B), from a colloidal silica sol prepared by a method different from the method according to the invention (curve C) and from the alcoholic colloidal silica sol used for preparing this sol (curve A).

DETAILED DISCUSSION OF PARTICULAR EMBODIMENTS

For the sake of simplification, the colloidal silica sols and the thin films prepared by the method according to the invention will respectively be designated in the following as <<sols according to the invention>> and <<thin films according to the invention>>.

EXAMPLE 1

Preparation of Sols According to the Invention

First of all, a colloidal silica sol is prepared in an alcoholic medium which will be designated hereafter as SM1, with a pH of 9 and a $SiO_2$ mass content of 3.80%.

To do this, 3,880 g of absolute ethanol are mixed with 507 g of tetraorthosilicate (TEOS) in a stirred flask for 15 minutes, and 134 g of ammonia concentrated to 28% are then added. Stirring is further continued for 15 minutes after which the solution is left at rest in order to allow it to ripen.

The hydrolysis rates $(H_2O/Si)_{mol}$ and $(OH^-/TEOS)_{mol}$ are 2.2 and 0.91 respectively.

After 3 weeks of ripening, a stable monodispersed sol of pearlescent color, which has a viscosity of 1.44 cP and a surface tension of 23.40 mN/m and in which the silica particles have an average particle size of 20 nm, is obtained.

A series of sols according to the invention are then prepared by adding into a flask 200 mL of SM1 (pH 9) to 200 mL of a mixture of water and absolute ethanol, the water/ethanol mass ratio of which is selected depending on the water mass content which the sols shall have.

After stirring, the thereby obtained solutions are subject to evaporation in the rotary evaporator (Rotavapor™) at 40° C., under a pressure of the order of 100 mPa, until the $SiO_2$ mass content of the sols is brought back to about 3.50%. Evaporation is conducted dropwise in order to avoid evaporation of the water present in the sol.

Next, the sols are filtered on a 0.45 μm WHATMAN™ filter in polypropylene.

Are thus prepared:
a sol with 5% by mass of water, designated hereafter as Sol5, by using a water/ethanol 5/95 (m/m) mixture;
a sol with 24% by mass of water, designated hereafter as Sol24, by using a water/ethanol 24/76 (m/m) mixture;
a sol with 41% by mass of water, designated hereafter as Sol41, by using a water/ethanol 41/59 (m/m) mixture;
a sol with 44% by mass of water, designated hereafter as Sol44, by using a water/ethanol 44/56 (m/m) mixture;

a sol with 46% by mass of water, designated hereafter as Sol46, by using a water/ethanol 46/54 (m/m) mixtures;

a sol with 65% by mass of water, designated hereafter as Sol65, by using a water/ethanol 65/35 (m/m) mixture;

a sol with 67% by mass of water, designated hereafter as Sol67, by using a water/ethanol 67/33 (m/m) mixture;

a sol with 77% by mass of water, designated hereafter as Sol77, by using a water/ethanol 77/23 (m/m) mixture;

a sol with 87% by mass of water, designated hereafter as Sol87, by using a water/ethanol 87/13 (m/m) mixture; and a sol with 91% by mass of water, designated hereafter as Sol91, by using a water/ethanol 91/9 (m/m) mixture.

All these sols have a pH comprised between 8 and 9.

Their water mass content is determined from abacuses made on measurements of density by pycnometry and of surface tension of various water/absolute ethanol mixtures. It is therefore obtained by crossed measurements of density and of surface tension. The relative error is less than 4% on the water mass percentage.

For strictly comparative purposes, another alcoholic colloidal sol is prepared but which itself has a pH of 7, by heating 1 L of SM1 with reflux of ethanol (79° C.) for 12 hours in order to remove the ammonia present in this sol. The thereby obtained sol will be designated hereafter as SM2.

Next, a sol with a water mass content of 45%, designated hereafter as Sol45, is prepared by following an operating procedure identical with the one described above for preparing sols according to the invention, except that 200 mL of SM2 are added in the flask to 200 mL of a water/absolute ethanol 45/55 (m/m) mixture.

The pH of the thereby obtained Sol45 is 7.

EXAMPLE 2

Characteristics of the Sols According to the Invention 2.1. Stability of the Sols The stability of the sols according to the invention is appreciated by measuring their viscosity on the day of their preparation, and then at intervals over a period of one year from this day.

These viscosity measurements are conducted at 21° C., by using a cylinder viscosimeter of the Rheovisco™ brand, Model ELV-8 and by having subjected the sols beforehand to magnetic stirring for 5 minutes.

Table 1 hereafter gives the viscosity values as obtained for Sol24, Sol44, Sol77 and Sol91 on the day of their preparation ($t_0$) and after 20 days ($t_{20days}$) and, for Sol44, Sol77 and Sol91, after six months ($t_{6months}$) and after one year ($t_{1year}$). Viscosity values obtained for the SM1 used for preparing these sols are also indicated as a comparison.

TABLE I

| Sols | Viscosity (cP) | | | |
|---|---|---|---|---|
| | $t_0$ | $t_{20days}$ | $t_{6months}$ | $t_{1year}$ |
| SM1 | 1.63 | 1.53 | 2.17 | 1.94 |
| Sol24 | 2.71 | 2.72 | — | — |
| Sol44 | 3.48 | 3.39 | 3.56 | 4.04 |
| Sol77 | 3.09 | 2.86 | 2.38 | 2.04 |
| Sol91 | 2.09 | 1.84 | 1.54 | 1.61 |

This table shows that the viscosity of the sols according to the invention does not change much over a period of one year, which expresses excellent stability of the sols.

2.2. Surface Reactivity of the Silica Particles Present in the Sols

The surface reactivity of the silica particles present in the sols is an essential factor of mechanical cohesion of the thin films obtained from these sols.

It is therefore appreciated by transforming the sols according to the invention into powders, by evaporating the liquid phase of these sols obtained by taking solutions and putting them into a ventilated oven for 24 hours at a temperature of 21° C., and by subjecting the thereby obtained powders to a series of analyses notably including:

differential thermal analyses (DTAs), silicon ($^{29}$Si) nuclear magnetic resonance (NMR) analyses with a cross polarization sequence coupled with rotation of the magic angle (CP/MAS for <<Cross Polarization/Magic Angle Spinning>>), and textural analyses by nitrogen adsorption/desorption.

For strictly comparative purposes, powders obtained from SM1, or SM2 as well as from Sol45, under the same conditions as those specified above, are also subject to these analyses.

2.2.a. Detection of a Solvation Water Layer on Silica Particles

The DTA analyses which give the possibility of measuring the released or adsorbed energy by the silica particles during a heating cycle, are conducted by heating the powders of the sols from 30 to 700° C., at a rate of 10° C./min and in an air atmosphere.

Figure 1:
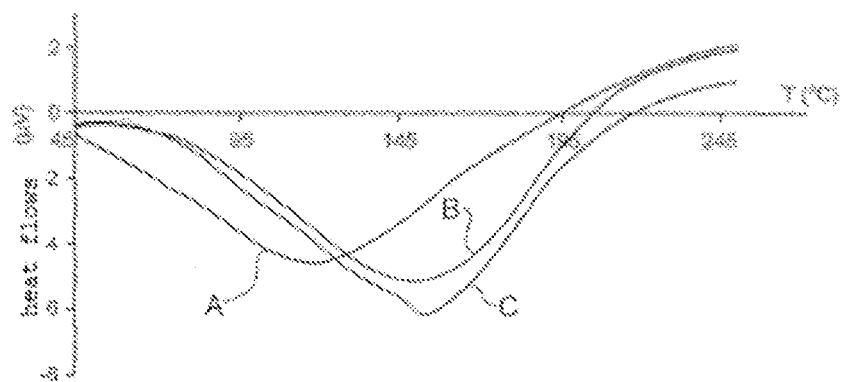
FIG. 1 illustrates the results of differential thermal analyses conducted on powders respectively obtained from two colloidal silica sols prepared by the method according to the invention (curves B and C) and from the alcoholic sol of colloidal silica used for preparing these sols (curve A).

The results are illustrated in FIG. 1 in the form of curves which represent the heat flows, expressed in microvolts, as measured between 45 and 250° C. for the powders of Sol41 (curve B), of Sol87 (curve C) and, as a comparison, for the powder of SM1 (curve A).

This figure shows that the endothermal peak relating to physisorbed water on the silica particles is located at higher temperatures for the sols according to the invention than for the alcoholic sol SM1 used for their preparation, which expresses a stronger adsorption of physisorbed water on the silica particles present in the sols according to the invention.

The $^{29}$Si CP/MAS NMR analyses give the possibility of tracking the time-dependent change of the sole silicon atoms close to the protons and, therefore, located at the surface of the silica particles, considering that inside the particles, there only exist Si—O—Si bonds. A transfer of the protons towards the silicon atoms can only occur if the atoms are relatively close spatially, i.e. located at a few angstroms from each other. Thus, silicon atoms are mainly observed, which bear 1 hydroxyl group (—Si(OH) or Q3) or 2 hydroxyl groups (—Si(OH)$_2$ or Q2). The time-dependent change of the Q3 (SiOH) and Q2 (Si(OH)$_2$) peaks is tracked; the peak Q4 corresponding to a silicon atom without any hydroxyl bonds, is used as reference peak with an area identical for all the powders.

Figure 2:
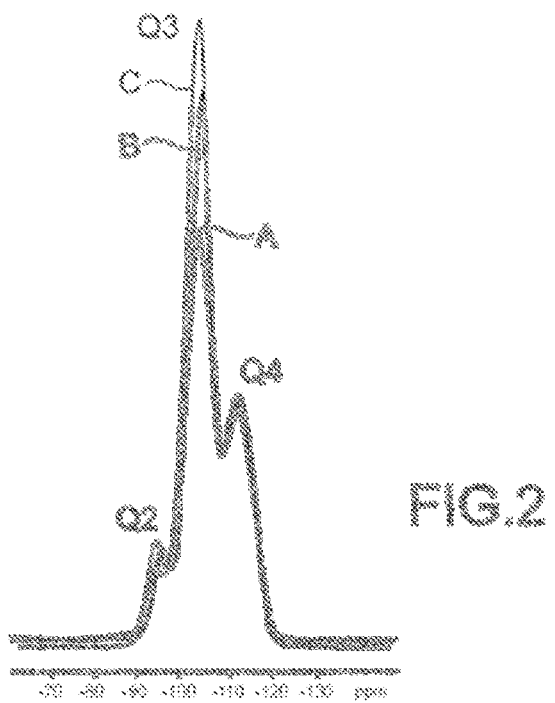
FIG. 2 illustrates $^{29}$Si CP/MAS NMR spectra exhibited by powders respectively obtained from two colloidal silica sols prepared by the method according to the invention (curves B and C) and from the alcoholic colloidal silica sol used for preparing these sols (curve A).

FIG. 2 illustrates the thereby obtained spectra for the powders of Sol41 (curve B), of Sol87 (curve C) and, as a comparison, for the powder of the SM1 (curve A).

This figure shows that the intensity of the Q3 peak increases when the water mass content of the sols, from which stem the powders, increases. Therefore more signal is observed on the silanols SiOH. This increase in the intensity of the Q3 peak is related to the presence of water bound around these sites.

Textural analyses by adsorption/desorption of nitrogen themselves notably allow determination of the specific surface area of the silica particles.

The results obtained for the powders of Sol5, of Sol45, of Sol87 and, as a comparison, for the powder of the SM1 are reported in Table 2 below.

TABLE 2

| Sols | Specific surface area (m²/g) |
| --- | --- |
| SM1 | 482 |
| Sol5 | 458 |
| Sol41 | 391 |
| Sol87 | 336 |

This table shows that the specific surface area of the silica particles present in the sols according to the invention decreases when the mass water content of these sols increases. This reduction in the specific surface area corresponds to a reduction in the accessibility of nitrogen to the surface of the silica particles, due to the presence of a solvation water layer around the particles.

2.2.b. Influence of the Surface Charge of the Silica Particles

In order to appreciate the influence of the surface charge of the silica particles on the reactivity of the surface of these particles, the $^{29}$Si CP/MAS NMR spectra of the powders obtained from Sol42 and from SM1 are compared with those of the powders obtained from Sol45 and from SM2.

The specific surface areas of these powders as determined by adsorption/desorption of nitrogen are also compared.

The spectra are illustrated in FIG. 3, curve B corresponding to the SM1 powder, curve A to the SMS powder, curve C to the Sol45 powder and curve D to the Sol46 powder, while the specific surface areas are shown in Table 3 hereafter.

TABLE 3

| Sols | Specific surface area (m²/g) |
| --- | --- |
| SM1 | 496 |
| SM2 | 485 |
| Sol46 | 327 |
| Sol45 | 455 |

FIG. 2 shows that the powder obtained from SM1 (at a pH of 9) has a peak Q3 of higher intensity than that of peak Q3 of the powder obtained from SM2 (at a pH of 7).

Similarly, the powder obtained from Sol46, which was prepared from SM1, has a peak Q3 of higher intensity than that of peak Q3 of the powder of Sol45 which was itself prepared from SM2 and without adjustment of its pH to a value at least equal to 8.

The presence of water bound to the silanols SiOH located at the surface of the silica particles is therefore all the larger since the pH on the one hand and the water mass content on the other hand of the sols are higher.

Moreover, Table 3 does not show any significant difference between the specific surface areas exhibited by the powders of SM1 and of SM2, the specific surface areas being located around 490 m²/g.

On the other hand, it shows that an increase in the water mass content causes a significant reduction in the specific surface area in the case of the powder of Sol46 (S=327 m²/g) but not in the case of that of Sol45 (S=455 m²/g).

The adsorption of the solvation water layer around the particles is therefore stronger in Sol46 than in Sol45.

EXAMPLE 3

Production of Thin Films According to the Invention 3.1. Preparation of the Substrates A series of substrates are prepared, which are all identical, in silica glass, having a measured diameter of 50 mm on 10 mm of thickness. The quality of the polishing is 1λ (λ=1,064 nm) and the refractive index is 1.45 at a wavelength of 600 nm.

These substrates are washed with a hydrofluoric acid solution diluted to 1% by volume. They are then rinsed with deionized water, cleaned with a detergent solution of vegetable soap (Green Soap™ from ELLI LILLY Co.), and then again successively rinsed with pure water and absolute ethanol.

3.2. Deposition of the Sols on the Substrates

The depositions of the sols on the substrates are produced in a clean room in order to avoid particulate pollution and to guarantee reproducibility from one sample to the other. The temperature of the room is 21±1° C. while its humidity level is 45±5° C.

Moreover, these deposits are made by spin-coating by using a CONVAC spin-coater, model CONVAC™ 1001. The sols are injected on the rotating substrates by means of a 2 mL syringe provided with a 0.45 μm WHATMANN™ filter in polypropylene. Both faces of a same substrate are covered with a same sol.

For each sol, the speed of rotation of the substrate and the number of deposited layers on both faces of the substrate are adjusted so as to obtain a thin film with a thickness of about 200 nm, which corresponds to a transmission spectrum at a maximum λ/4 peak located at 1,000 nm.

As an illustration, Table 4 hereafter shows the speeds of rotation of the substrates used for producing deposits of different sols according to the invention, as well as the thickness of the respectively obtained thin films.

TABLE 4

| Sols | Speed of rotation (revolutions/min) | Thickness (nm) |
| --- | --- | --- |
| Sol5 | 2,100 | 195 |
| Sol41 | 1,700 | 210 |
| Sol46 | 1,700 | 180 |
| Sol65 | 3,000 | 200 (in 2 layers) |
| Sol67 | 3,500 | 184 (in 2 layers) |
| Sol87 | 3,000 | 200 (in 2 layers) |

For strictly comparative purposes, thin films are also prepared by depositing SM1, SM2 and Sol45 on substrates prepared as described above and under the same operating conditions as those used for depositing the sols according to the invention. As an illustration, the speeds of rotation of the substrates used for making the deposits of these three sols as well as the thicknesses of the obtained thin films are shown in Table 5 hereafter.

TABLE 5

| Sols | Speed of rotation (revolutions/min) | Thickness (nm) |
| --- | --- | --- |
| SM1 | 2,200 | 187 |
| SM2 | 2,200 | 190 |
| Sol45 | 1,700 | 184 |

3.3. Treatment of Thin Films with Ammonia Vapors

Thin films obtained as described in point 3.2 of the present example are treated with ammonia vapors by maintaining these films for 17 hours in a dryer in which is placed a 28% ammonia aqueous solution.

3.4. Post-Treatment with Hexamethyldisilazane of Thin Films Treated Beforehand with Ammonia Thin films treated beforehand with ammonia vapors as described in point 3.3 of the present example are treated with vapors of hexamethyldisilazane (HMDS) of formula $(CH_3)_3$—Si—NH—Si—$(CH_3)_3$, by maintaining these films for 48 hours in a dryer in which is placed a crystallizer containing pure HMDS.

EXAMPLE 4

Properties of the Thin Films According to the Invention 4.1. Thin Films Treated with Ammonia Vapors The optical and abrasion resistance properties of thin films treated with ammonia are appreciated by submitting these films, before and after this treatment, to:

- optical transmission measurements on a PERKIN-ELMER™ Lambda 19 spectrophotometer in the spectral range 200-1,500 nm, which allow determination for each film, of the transmission percentage at $\lambda/4=1,000$ nm, of its thickness and of its refractive index (n), on the one hand, and
- a <<moderate>> abrasion resistance test according to the US-MIL-C-0675C standard which allows determination of the number of round trips which an abrasive gum has to cover over the surface of a film in order to obtain complete destruction of this film, i.e. exposure of the underlying substrate, on the other hand and comparison of the obtained results.

Table 6 hereafter shows the transmission percentages (% T) at $\lambda/4$, the refractive indexes (n), the thicknesses (e) and the number of round trips (forward/backwards) as determined, before and after treatment with ammonia, for thin films made with sols according to the invention, i.e. the sols Sol5, Sol41, Sol46, Sol67 and Sol87, and as a comparison, for thin films made with the sols SM1, SM2 and Sol45.

TABLE 6

| Sols | % T at $\lambda/4$ | | n | | e (nm) | | A/R | |
|---|---|---|---|---|---|---|---|---|
| | Before | After | Before | After | Before | After | Before | After |
| SM1 | 99.89 | 99.98 | 1.22 | 1.22 | 209 | 181 | 1 | 4 |
| Sol5 | 99.84 | 99.99 | 1.22 | 1.22 | 221 | 216 | 1 | 8 |
| Sol41 | 99.73 | 99.76 | 1.25 | 1.25 | 178 | 172 | 1 | 35 |
| Sol46 | 99.83 | 99.76 | 1.24 | 1.24 | 195 | 195 | 1 | 35 |
| Sol67 | 99.74 | 99.77 | 1.25 | 1.25 | 177 | 170 | 1 | 40 |
| Sol87 | 99.68 | 99.34 | 1.26 | 1.28 | 172 | 169 | 1 | 40 |
| SM2 | 99.90 | 99.81 | 1.22 | 1.24 | 200 | 185 | 1 | 3 |
| Sol45 | 99.91 | 99.83 | 1.22 | 1.25 | 210 | 210 | 1 | 5 |

This table first of all shows that the presence of water in colloidal silica sols is expressed—except in the case when this content is very low (Sol5)—by a slight increase in the refractive index of the thin films made with the sols.

It also shows that a treatment with ammonia may have the effect of still slightly increasing this refractive index but the latter remains, in any case less than 1.29 for the thin film made with the sol according to the invention having the highest water mass content (Sol87), which is quite compatible with use of thin films according to the invention as anti-reflective films.

It also shows that in the absence of a treatment with ammonia, the thin films made with sols according to the invention do not have an abrasion resistance greater than that of the thin film made with the alcoholic sol SM1 having been used for the preparation of these sols.

On the other hand, after treatment with ammonia, the thin films made with sols according to the invention show a dramatic increase in their abrasion resistance which is observed neither for the thin film made with the alcoholic sol SM1, nor for the thin film made with the alcoholic sol SM2 of pH 7, nor for the thin film made with Sol45 which was prepared from SM2.

4.2. Thin Films Treated with Ammonia Vapors and then Post-Treated with Hexamethyldisilazane Vapors The effect of a post-treatment with HMDS is appreciated by submitting thin films according to the invention, before treatment with ammonia, after treatment with ammonia and after post-treatment with HMDS, not only to optical transmission measurements and to the abrasion resistance tests mentioned earlier in point 4.3 of the present example, but also to contact angle measurements, and by comparing the obtained results.

Measurements of the contact angle are conducted with a GBX goniometer, model DGD-Fast/60, and consist of measuring the contact angle formed by a deionized water drop when this drop is deposited on the surface of a thin film. The higher the value of this angle, i.e. of more than 90°, the more the surface of the film is hydrophobic.

As an illustration, Table 7 hereafter shows the transmission percentages (% T) at $\lambda/4$, the refractive indexes (n), the thicknesses (e), the number of round trips (forwards/backwards) and the contact angles ($\theta$) as determined, before treatment with ammonia, after treatment with ammonia and after post-treatment with HMDS, for a thin film made with a sol according to the invention, in this case Sol65.

TABLE 7

| | % T at $\lambda/4$ | n | e (nm) | F/B | $\theta$ (°) |
|---|---|---|---|---|---|
| Before treatment with $NH_3$ | 99.75 | 1.25 | 196 | 1 | 8 |
| After treatment with $NH_3$ | 99.39 | 1.27 | 196 | 40 | 65 |
| After treatment with $NH_3$ and HMDS | 98.96 | 1.30 | 195 | 20 | 126.5 |

This table shows that post-treatment with HMDS causes an increase in the refractive index of the thin film of Sol65 from 1.27 to 1.30 locating the transmission peak around 99% at $\lambda/4=1,000$ nm.

It also shows that this post-treatment causes a decrease in the abrasion resistance of the film of Sol65 since the latter passes from 40 round trips to 20 round trips. However, the abrasion resistance remains much greater than that of a thin film of Sol65 not having been subject to any treatment.

As to the hydrophobicity of the surface, it is seen that it is greatly improved both by the treatment with ammonia and then by the post-treatment with HMDS since the contact angle successively passed from 8 to 65°, and then from 65° to 126.5°.

QUOTED REFERENCES

[1] FR-A-2 703 791
[2] Gulley et al., *Journal of Colloid and Interface Science*, 241 (2001) 340-345

[3] Neel et al., *Journal of Colloid and InterfaceScience*, 230 (2000) 244-253

The invention claimed is:

1. A method for preparing a sol of a metal oxide having a water mass content greater than 40%, the sol having further a pH value ranging from 8 to 10, a metal oxide mass content ranging from 2% to 6% and a viscosity varying at most by ±35% over a period of time of one year, which method comprises:
   (a) hydrolyzing a precursor of the metal oxide at a pH ranging from 8 to 14 in a medium consisting of an alcohol or a mixture of alcohols added with a base to form an alcoholic sol;
   (b) ripening the alcoholic sol at room temperature;
   (c) diluting the alcoholic sol with a mixture of water and of one or several alcohols to form a hydroalcoholic sol;
   (d) evaporating the alcohol(s) from the hydroalcoholic sol until obtaining the water mass content greater than 40% and the metal oxide mass content ranging from 2% to 6%; and, if the pH value of the thereby obtained sol does not range from 8 to 10,
   (e) adjusting the pH of the sol to the pH value ranging from 8 to 10; wherein no stabilizer is used in any one of (a) to (e).

2. The method of claim 1, wherein the alcohol(s) is(are) evaporated in a rotary evaporator, at a temperature ranging from 20° C. to 55° C. and under a pressure ranging from 20 mPa to 200 mPa.

3. The method of claim 1, wherein the alcohol is absolute ethanol.

4. The method of claim 1, wherein the base is ammonia.

5. The method of claim 1, wherein the sol is a sol of silica, zirconia, alumina, or titanium oxide.

6. The method of claim 1, wherein the sol is a sol of silica.

7. The method of claim 5, wherein (a) comprises hydrolysis-condensation of a metal oxide precursor of formula $A_xM_y$, wherein M represents a metal or a metalloid selected from silicon, zirconium, aluminum and titanium, and A represents a hydrolyzable group selected from a halide, a nitrate, an oxalate, a carbonate, a sulfate and an alcoholate of formula R—O⁻ wherein R is a linear or branched alkyl group or a phenyl group.

8. The method of claim 7, wherein the alkyl group is a $C_1$-$C_{10}$ alkyl group.

9. The method of claim 7, wherein the metal oxide precursor is tetramethoxysilane or tetraethoxysilane.

10. A method for making a film on a substrate, which comprises preparing a sol of a metal oxide having a water mass content greater than 40%, a pH value ranging from 8 to 10, a metal oxide mass content ranging from 2% to 6%, and a viscosity varying at most by 35% over a period of time of one year, by a method of claim 1;
   depositing one or several layers of the sol on one face or both faces of the substrate;
   drying the deposited layer(s); and
   treating the dried layer(s) with ammonia vapors.

11. The method of claim 10, which further comprises a treatment of the film with hexamethyldisilazane in a liquid or gas medium.

12. The method of claim 10, wherein the film is a thin silica film which measures from 5 nm to 500 nm in thickness.

13. A method for preparing a sol of a metal oxide having a water mass content greater than 40%, the sol having further a pH ranging from 8 to 10, a metal oxide mass content ranging from 2% to 6% and a viscosity varying at most by ±35% over a period of time of at least one year, which method comprises:
   (a) hydrolyzing a precursor of the metal oxide at a neutral pH in a medium consisting of an alcohol or a mixture of alcohols to form an alcoholic sol;
   (b) ripening the alcoholic sol at room temperature;
   (c) dialyzing the alcoholic sol in water to form a hydroalcoholic sol;
   (d) evaporating the alcohol(s) from the hydroalcoholic sol until obtaining the water mass content greater than 40% and the metal oxide mass content ranging from 2% to 6%; and
   (e) adjusting the pH of the sol by adding a base to the sol to the pH value ranging from 8 to 10;
wherein no stabilizer is used in any one of (a) to (e).

14. The method of claim 13, wherein the alcohol(s) is(are) evaporated in a rotary evaporator, at a temperature ranging from 20° C. to 55° C. and under a pressure ranging from 20 mPa to 200 mPa.

15. The method of claim 13, wherein the alcohol is absolute ethanol.

16. The method of claim 13, wherein the base is ammonia.

17. The method of claim 13, wherein the sol is a sol of silica, zirconia, alumina, or titanium oxide.

18. The method of claim 13, wherein the sol is a sol of silica.

19. The method of claim 17, wherein (a) comprises hydrolysis-condensation of a metal oxide precursor of formula $A_xM_y$ wherein M represents a metal or a metalloid selected from silicon, zirconium, aluminum and titanium, and A represents a hydrolyzable group selected from a halide, a nitrate, an oxalate, a carbonate, a sulfate and an alcoholate of formula R—O⁻ wherein R is a linear or branched alkyl group or a phenyl group.

20. The method of claim 19, wherein the alkyl group is a $C_1$-$C_{10}$ alkyl group.

21. The method of claim 19, wherein the metal oxide precursor is tetramethoxysilane or tetraethoxysilane.

22. A method for making a film on a substrate, which comprises preparing a sol of a metal oxide having a water mass content greater than 40%, a pH value ranging from 8 to 10, a metal oxide mass content ranging from 2% to 6% and a viscosity varying at most by 35% over a period of time of one year, by a method of claim 13;
   depositing one or several layers of the sol on one face or both faces of the substrate;
   drying the deposited layer(s); and
   treating the dried layer(s) with ammonia vapors.

23. The method of claim 22, which further comprises a treatment of the film with hexamethyldisilazane in a liquid or gas medium.

24. The method of claim 22, wherein the film is a thin silica film which measures from 5 nm to 500 nm in thickness.

* * * * *